United States Patent [19]

Walter et al.

[11] Patent Number: 4,879,606

[45] Date of Patent: Nov. 7, 1989

[54] EDTV RECORDING APPARATUS

[75] Inventors: James M. Walter, Columbus; Krishnamurthy Jonnalagadda, Plainsboro; Robert E. Flory, Princeton, all of N.J.

[73] Assignee: General Electric Company, Princeton, N.J.

[21] Appl. No.: 205,146

[22] Filed: Jun. 6, 1988

[51] Int. Cl.⁴ .............................................. H04N 9/79
[52] U.S. Cl. .................................... 358/330; 358/12; 358/16; 358/11
[58] Field of Search ..................... 358/12, 15, 16, 310, 358/330, 11

[56] References Cited

U.S. PATENT DOCUMENTS

| | | | |
|---|---|---|---|
| 4,476,484 | 10/1984 | Haskell | 358/16 |
| 4,485,401 | 11/1984 | Tan et al. | 358/12 |
| 4,510,520 | 4/1985 | Parker et al. | 358/15 |
| 4,521,803 | 6/1985 | Gittinger | 358/141 |
| 4,535,352 | 8/1985 | Haskell | 358/11 |
| 4,543,598 | 9/1985 | Oliphant | 358/12 |
| 4,613,912 | 9/1986 | Shibata et al. | 360/19.1 |
| 4,654,724 | 3/1987 | Nagano | 358/310 |
| 4,661,850 | 4/1987 | Strolle et al. | 358/12 |
| 4,661,863 | 4/1987 | Ichinot | 358/334 |
| 4,694,338 | 9/1987 | Tsinberg | 358/141 |
| 4,742,386 | 5/1988 | Wilkinson | 358/13 |

OTHER PUBLICATIONS

S. Higuchi et al., "An Experimental Color Under VCR for IDTV/EDTV System," IEEE Transactions Consumer Electronics, vol. 34, No. 1, Feb. 88, pp. 228-235.
Masami Itoga et al., "Two Channel FM Recording For High-Definition Baseband Signals", IEEE Trans. Consumer Electronics, vol. 34, No. 1, Feb. 88, pp. 78-84.
M. Isnardi et al., "Decoding Issues In The ACTV System", IEEE Transactions On Consumer Electronics, vol. 34, No. 1, Feb. 1988, pp. 111-120.
Y. Yasumoto et al., "A Wide Aspect Ratio Television System With Full NTSC Compatibility", IEEE Transactions Consumer Electronics, vol. 34, No. 1, Feb. 88, pp. 121-127.

Primary Examiner—John W. Shepperd
Attorney, Agent, or Firm—Joseph S. Tripoli; Eric P. Herrmann; James B. Hayes

[57] ABSTRACT

Extended definition television (EDTV) signals including a compatible composite wideband signal and a separate helper or extended definition signal are combined, for example, for recording purposes, using frequency multiplexing techniques. The helper signal is applied to a modulator, which produces a suppressed carrier modulated signal, to frequency shift the helper signal to a spectral band above the frequency band occupied by the compatible composite wideband signal. The frequency shifted and wideband signal are then added to form the combined signal.

11 Claims, 3 Drawing Sheets

EDTV RECORDING APPARATUS

This invention relates to extended definition television (EDTV) systems.

BACKGROUND OF THE INVENTION

EDTV systems are systems which are designed to transmit and receive television signals and provide the consumer with reproduced images of higher quality than those available from e.g. conventional NTSC systems. In addition it is highly desirable that the EDTV systems utilize conventional broadcast channels and be compatible with existing television receivers, that is, that existing receivers be capable of reproducing an EDTV signal with image quality substantially as good as conventional NTSC.

Two such systems are described in the Feb. 1988 volume of the *IEEE Transactions on Consumer Electronics,* (Vol. 34, No. 1). The first system is described in the article by Isnardi et al., entitled "Decoding Issues In The ACTV System", at pages 111-120. The second system is described in the article by Yasumoto et al., entitled "A Wide Aspect Ration Television System With Full NTSC Compatibility" at pages 121-127. Both systms originate images in wide screen format, and separately process the center and side portions of the image. Both systems generate a relatively wideband signal including information from the center image portions which is NTSC compatible. In addition both systems generate a relatively narrowband signal containing auxiliary information for producing an enhanced image. The narrowband signal (V-T helper signal) generated in the Isnardi et al. system includes field differential signals for each image frame. This signal is utilized in an EDTV receiver as an aid in generating progressive scan signals with reduced motion artifacts. The narrowband signal (multiplexed signal) generated in the Yasumato et al. system contains composite video information for the side portions of each image.

Both the Isnardi et al. and Yasumato et al. system transmit the wideband signal as a conventional NTSC signal. The narrowband signal is transmitted by quadrature modulating the picture carrier of the wideband signal, so that all of the image information is transmitted in a single channel.

In contemporary broadcast studios for example, video signals are generated in a camera and encoded into NTSC format. Nominally these signals are coupled, over a single broadband conductor, to the various studio processing, switching, special effects, etc. apparatus, and then to the transmitter. To maintain signal integrity much of the studio equipment has 15 MHz or greater signal handling capability. Practically however, the composite signal bandwidth is limited by the bandwidth capability of video tape recorders, (VTR's) which have a signal handling bandwidth of about 6 MHz.

The studio equipment does not have provision for handling the lower bandwidth signals generated in EDTV systems. These signals must be carried around the studio and delivered to the transmitter in parallel with the wideband compatible NTSC signal. At the transmitter the two signals are combined for brbadcasting. In general it would appear that for a studio to handle EDTV signals of the type having separate wideband and narrowband components, duplicate equipment is required for the two signals. This not only doubles the equipment cost to the broadcasters but also creates significant synchronizing and timing problems to maintain the proper relationship between the two signals.

The present invention obviates equipment duplicity and the timing and synchronization problems in an EDTV facility.

In, for example, the Isnardi et al. system higher frequency video information is effectively folded into the 4.2 MHz spectrum bandwidth of composite video signals. As such the wide bandwidth channels (15 MHz) of the studio equipment is under-utilized. In addition the majority of studio equipment is transparent to the makeup of the signal being processed.

Realizing these characteristics of the studio equipment, the present inventors discerned that the bandwidth of the limiting studio components (the 6 MHz bandwidth of VTR's) is sufficient to frequency multiplex the lower bandwidth signal with the higher bandwidth composite signal for transmission through the studio.

SUMMARY OF THE INVENTION

The present invention comprises a video signal processing system including an encoder for generating a wideband video signal containing sufficient information for reproducing an image according to one of the conventional television standards, and for producing a further signal containing information, which when appropriately combined with the wideband signal, produces an image of enhanced quality. Apparatus at the encoder, frequency multiplexes the narrowband and wideband signals for local transmission among various processing elements such as recording equipment.

DETAILED DESCRIPTION

The following description of the invention will be expressed in terms of the Isnardi et al. EDTV system though it is to be understood that the invention is not limited to the Isnardi et al. signal format.

Figure 1:
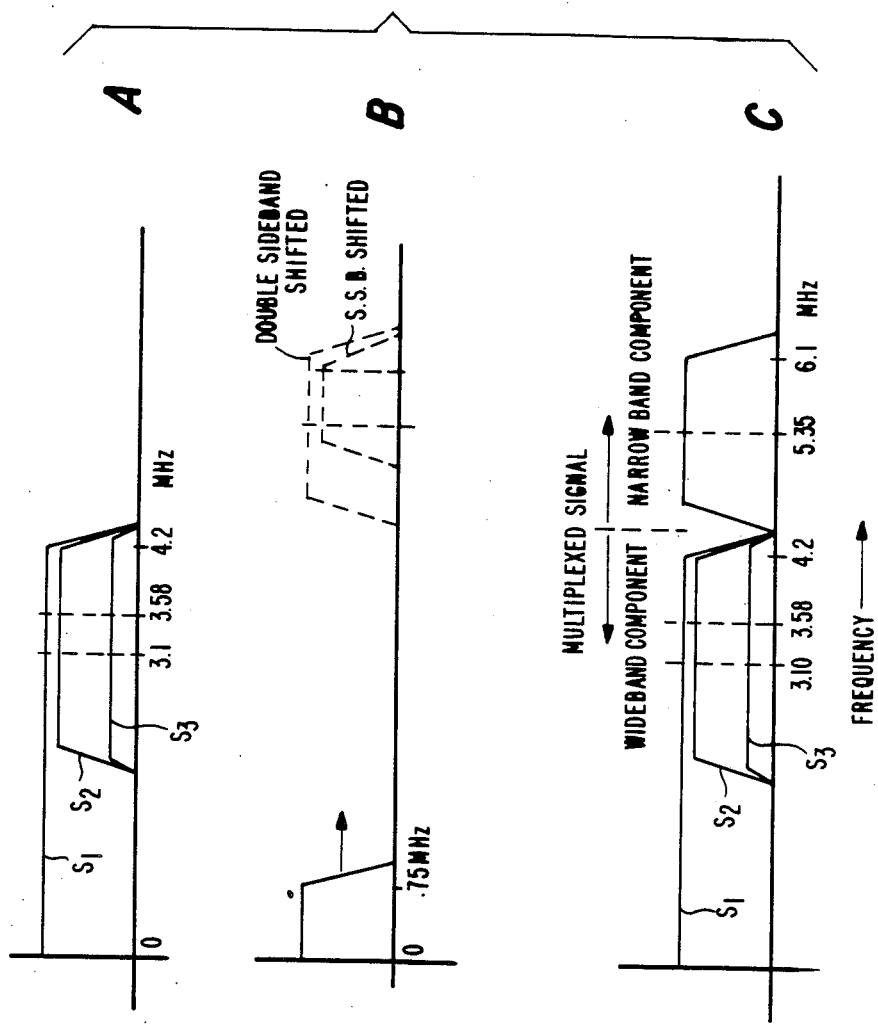
FIG. 1 is a schematic drawing illustrating the frequency spectrum of an EDTV signal, useful for describing the invention.

Referring to FIG. 1, the spectral diagram A illustrates the spectral components of the wideband NTSC compatible signal produced by the Isnardi et al. EDTV system (hereafter IEDTV). The signal consists of a luminance component $S_1$ having frequency components from zero to 4.2 MHz, a frequency interleaved chrominance component $S_2$ having frequency components from about 2MHz to 4.2 MHz, and a frequency interleaved extended definition component $S_3$ having frequency components from about 2-4.2 MHz. The luminance and chrominance components contain information relating to the center portion of the image and also includes compressed information relating to the side panels. The luminance and chrominance signals are combined in the conventional manner. Signal component $S_3$ contains two subcomponents. The first subcomponent includes high frequency luminance information, e.g., above 4.2 MHz. This information is frequency shifted to the frequency band of 0–1.2 MHz. The second subcomponent includes sidepanel high frequency information which is encoded in NTSC format and frequency shifted to the 0 –1.1 MHz band. The two subcomponents are amplitude compressed and caused to quadrature modulate an alternate subcarrier of 3.1 MHz. The subcarrier is an interlaced frequency whose phase is inverted on alternate fields. The quadrature modulated alternate subcarrier is linearly added to components $S_1$ and $S_2$ to form an NTSC compatible wideband composite video signal.

The spectral diagram B illustrates the frequency components of the V-T helper or extended definition signal of the IEDTV system. This signal has a bandwidth which is limited to 750 kHz. The generation of this signal will be discussed hereinafter with reference to FIG. 4.

In order to convey the wideband and extended definition signals on a single channel as discussed above, the extended definition signal is frequency shifted by modulating a further carrier and being added to the wideband signal to form the frequency multiplexed signal shown in the spectral diagram C of FIG. 1.

Figure 2:
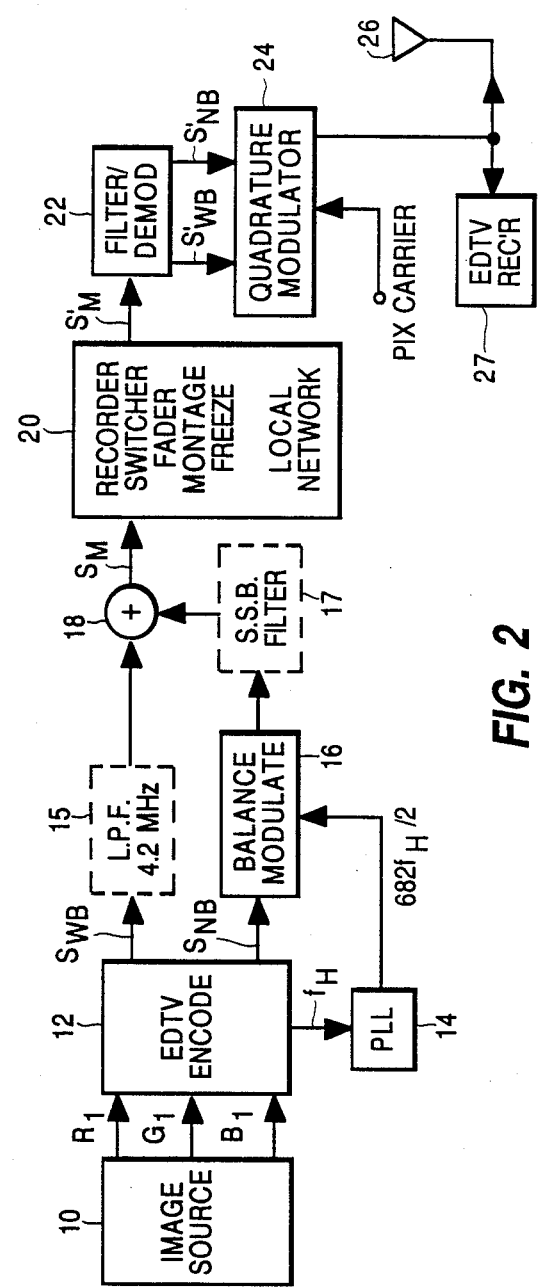
FIG. 2 is a block diagram of an EDTV system embodying the present invention.

Referring to FIG. 2, a localized television signal management system is illustrated. This system may include for example an entire broadcast studio or simply be a video tape recorder. In the former situation element 20 may include such items as a video switcher for selecting various video signal sources, a video recorder, and special effects equipment to fade or freeze images, form image montages, alter the speed of image action, etc. In the latter situation element 20 may consist of a single video recorder such as for example a type "C" VTR.

High quality video signals are provided in primary RGB component form by the image source 10. Image source 10 may be a progressive scan video camera which generates 1050 lines of video signal per frame interval. The RGB component signals are coupled to an EDTV encoder 12 which produces a wideband NTSC compatible signal, $S_{WB}$, and an extended definition signal, $S_{NB}$.

The extended definition signal $S_{NB}$ is coupled to a balanced modulator 16 which frequency shifts this signal to a spectral band above the spectral band occupied by the wideband signal $S_{WB}$. The modulated extended definition signal and the wideband signal are respectively coupled to summing circuit 18 which develops the frequency multiplexed signal $S_M$. The spectral content of signal $S_M$ for the IEDTV system comports with the spectral diagram C of FIG. 1.

Preferably the modulator 16 is of the type which produces a suppressed carrier signal so no contribution is added to the wideband signal in the absence of the extended definition signal. In addition it is preferred that the frequency of the carrier be locked to an even multiple of one half the line frequency of the wideband signal to minimize the potential for the generation of beat frequencies between the combined wideband and extended definition signals. In the FIG. 2 apparatus the carrier is developed by accessing the horizontal line rate signal $F_H$ from the EDTV encoder 12 and applying it to the phase locked loop 14. Phase locked loop 14 generates a carrier signal of $Nf_{H/2}$ which is coupled to the carrier signal input terminal of the modulator 16.

The bandwidth limitation for element 20 is nominally determined by the bandwidth of the video recorder included therein. The bandwidth of composite signal video recorder is approximately 6.1 MHz. The bandwidth of the IEDTV helper signal is 0.75 MHz. The carrier frequency for the modulated helper or extended definition signal of the IEDTV system, assuming double sideband modulation is thus 6.1 MHz minus 0.75 MHz or approximately 5.35 MHz. This translates to approximately 682 $f_{H/2}$. Using 682 $f_{H/2}$ there is substantially no mixing of the modulated extended definition signal and the wideband signal as indicated in the spectral diagram C of FIG. 1. Note greater signal separation may be effected by utilizing a single sideband modulated signal rather than the double sideband signal as illustrated. In this instance the carrier frequency applied to the modulator 16 will be increased to about 6 MHz (764 $f_{H/2}$). To produce a single sideband signal the output of modulator is coupled through a single sideband filter 17 (shown in phantom) having a passband centered about the lower sideband of the signal generated by the modulator 16.

Depending on the particular EDTV encoder utilized, the wideband composite signal $S_{WB}$ may not be bandwidth limited. For example the chrominance component may contain a wideband I color difference signal component with frequency components extending to 5.1 MHz (3.58 + 1.5 MHz). In this instance the wideband signal must be bandwidth limited to provide room in the spectrum for the modulated extended definition signal. This function may be provided by inserting a lowpass filter 15 with, for example, a 4.2 MHz cutoff between the wideband output terminal of encoder 12 and the summing circuit 18.

The combined signal $S_m$ is coupled to the composite signal input terminal of element 20 which may be considered to be a video recorder having a 6.1 MHz signal bandwidth. Element 20 produces a processed (e.g., time shifted) combined signal $S'_m$ having the same format as signa $S_m$. If the signal $S'_m$ is to be transmitted in a standard broadcast channel, it must first be decomposed and reformatted because the bandwidth of signal $S'_m$ exceeds the bandwidth of standard video signals.

The signal $S'_m$ from element 20 is coupled to a filter/demodulator, 22, which separates the wideband signal $S'_{WB}$ from the modulated narrowband signal and frequency shifts (by, e.g., synchronous demodulation) the narrowband signal $S'_{NB}$ down to baseband. The separated signals $S'_{WB}$ and $S'_{NB}$ are coupled to a modulator circuit 24 which quadrature modulates a picture carrier with the two signals. The modulated picture carrier is then applied to a broadcast antenna 26 or the RF input of an EDTV receiver 27.

Figure 3:
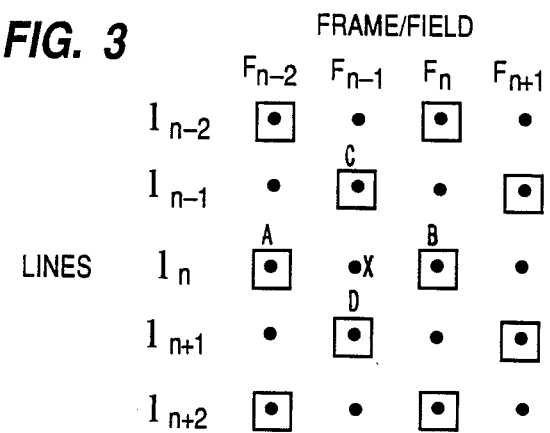
FIG. 3 is a pictorial representation of portions of several fields of video signal.

Generation of the V-T helper signal of the IEDTV system will be described with reference to FIGS. 3 and 4. The dots in FIG. 3 represent lines of video signal from portions of four fields of a progressively scanned image. Each of the columns of dots represents a portion of a field/frame of video signal. In generating the wideband luminance signal component and the chrominance components, the progressive scan signals are converted to interlaced scanned signals by selecting alternate lines of signal and discarding the intervening lines. The selected lines of signal are shown circumscribed by square boxes. The selected lines are time expanded from the progressive scan line interval of 31.78 μsec to the interlace scan line interval of 63.56 μsec.

The V-T helper signal contains information resident in the discarded lines and is generated as follows. The helper signal for each discarded line X is formed by averaging the signals from the temporally adjacent lines (e.g., (A+B/2) and subtracting the average from the signal representing line X, that is the signal V-T for line X is equal to X−(A+B)/2. Since there is nominally a high degree of redundancy between temporally adjacent lines the V-T helper signal will contain relatively little energy and have relatively low frequency components. At the IEDTV receiver the interlaced signals are converted to progressive scan signals for display. The originally discarded lines are reconstructed with the aid of the V-T helper signal. To reconstruct line X the receiver forms the average (A+B)/2 of lines A and B from the wideband signal and adds this average to the V-T helper (X−(A+B)/ 2). The sum corresponds to signal representing line X.

Figure 4:
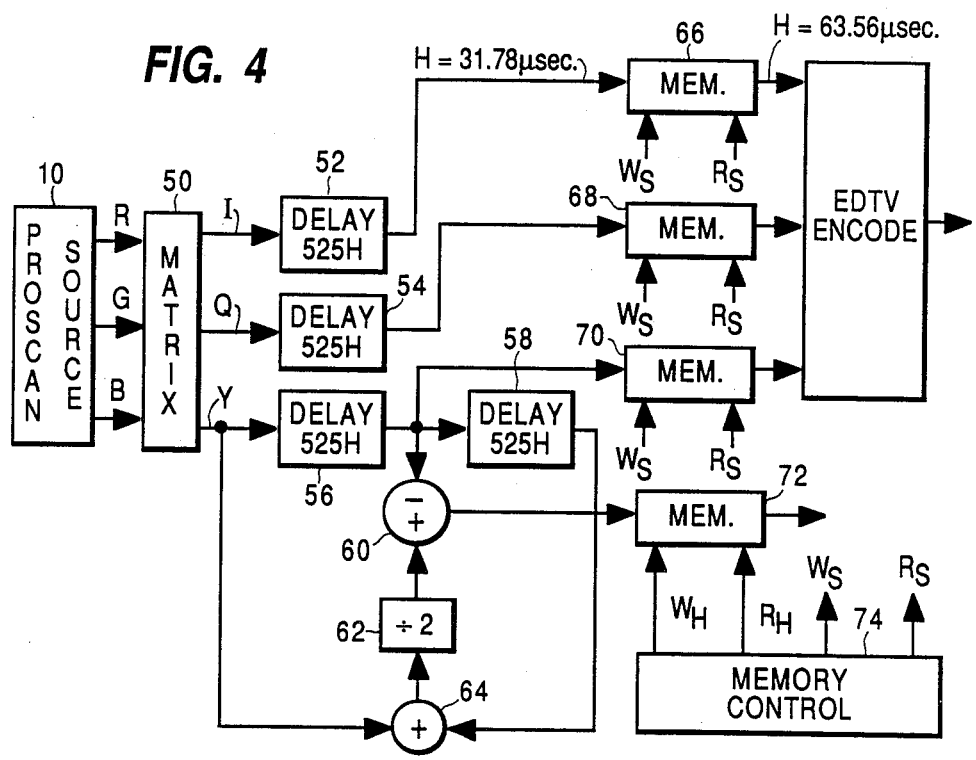
FIG. 4 is a block diagram of that portion of a particular EDTV system which generates a narrowband signal component.

In FIG. 4 the progressive scan high quality RGB signals from image source 10 are applied to a matrix circuit, 50, which develops progressive scanned luminance, Y, and two color difference signals I and Q. The luminance signal is coupled to the cascade connected delay elements 56 and 58 each of which delays the luminance signal by 525 progressive scan line intervals. During alternate line intervals, luminance signal provided by delay element 56 corresponds to selected lines for wideband signal generation. During the selected line intervals, the signal is written into memory 70 at the progressive scan signal sample rate under the control of the write address control signal $W_S$. Thereafter the signal applied to memory 70 is read out at half rate to expand each selected line signal to 63.56 μsec. Memory read out of the wideband luminance signal is controlled by the read address signal $R_S$.

During intervening line intervals signal corresponding to discarded lines is provided by delay element 56. Concurrent with a discard line (X) being provided by delay element 56, temporally adjacent lines (A, B) are available at the output port of delay element 58 and the input port of delay element 56 respectively. The temporally adjacent line signals (A, B) are coupled to adder 64 which generates their sum and applies the sums to the divide-by-two circuit 62. The output signal from divide-by-two circuit 62, corresponding to the average of the temporally adjacent signals, is coupled to the subtracter 60. The signal provided by delay element 56 is coupled to a second input port of the subtracter 60 which generates the time compressed V-T helper signal. During the intervening line intervals the compressed V-T helper (extended definition) signal is written to memory 72 at the progressive scan sample rate responsive to the write address signals $W_H$. Thereafter the samples in memory 72 are read out at half rate responsive to the read address signal $R_H$ to expand the lines of extended definition signal to encompass the interlace scan line interval.

The I and Q component samples from the matrix 50 are coupled to delay elements 52 and 54 to time align them with the luminance samples from delay element 56. Selected lines of I and Q samples are written into memories 66 and 68 respectively responsive to write address signals $W_S$ and read out in time expanded format responsive to the read address signal $R_S$.

The selected luminance Y, and I and Q lines of signal from memories 70, 66 and 68 are applied to the encoder circuitry 76, which generates the wideband signal depicted in the spectral diagram A of FIG. 2.

The write address signals $W_S$ and $W_H$ and read address signals $R_S$, $R_H$ are generated in a conventional manner by the memory control circuit 74.

In an alternative embodiment delay elements 52, 54, 56 and 58 may be realized with one-line-period delay elements. In this instance the extended definition signal will include vertical information rather than vertical temporal information. The extended definition signal corresponding to line X will be generated according to the algorithm (X−(C+D)/2). For an extended definition signal of this type a compatible receiver will be arranged to combine the average of vertically adjacent lines (C+D)/2 with the extended definition signal to generate signals representing the discarded lines X.

The apparatus described above is intended to be exemplary. Armed with the foregoing information one skilled in the art of video signal processing systems will be able to construct variations thereo without straying from the spirit of the invention. For example the circuitry illustrated in FIG. 2 may be incorporated in a Camcorder.

What is claimed is:

1. Apparatus for recording an extended definition video signal comprising:
   a source of video signal;
   an extended definition television signal encoder coupled to said source and responsive to said video signal for generating a wideband video signal representing luminance and chrominance information; and generating a narrow band video signal representing differences between horizontal video signal lines which are separated in one of a spatial and temporal dimension;
   modulator means for frequency shifting said narrow band signal to produce a modulated signal occupying a frequency band above the frequency band occupied by said wideband signal;
   combining means, coupled to said modulator means and said encoder for combining said wideband signal and the frequency shifted narrow band signal to produce a combined signal; and
   means including composite video signal recording means coupled to said combining means for recording said combined signal.

2. The apparatus set forth in claim 1 wherein said modulator means comprises:
   means for providing a carrier signal;
   suppressed carrier modulating means, responsive to said narrow band signal, for modulating said carrier signal.

3. The apparatus set forth in claim 2 wherein said modulating means further includes filter means coupled to said suppressed carrier modulating means, for passing a single side band of said modulated signal.

4. The apparatus set forth in claim 1 wherein said wideband signal is formulated in horizontal line segments occurring at a line frequncy of $f_H$, and said modulator means comprises:
   means for providing a carrier signal having a frequency which is an integral multiple of said line frequency $f_H$, and phase locked thereto;
   modulating means, responsive to said narrow band signal, for modulating said carrier signal.

5. The apparatus set forth in claim 1 wherein said means including composite video signal recording means, further includes:
   means coupled to said composite video signal recording means for separating said combined signal into a first signal representing said wideband video signal and a second signal representing said narrow band signal; and
   further modulator means for modulating an RF picture carrier with said first and second signals.

6. A video signal processing system comprising:
a source of video signal formatted in field/frames of horizontal lines of image information;
encoder means coupled to said source and responsive to said video signal for generating a wideband and a further luminance signal, said wideband luminance signal being a baseband signal compatible with conventional broadcast standards, said further luminance signal representing signal differences between one of spatially and temporally adjacent horizontal lines of video signal occuping a frequency spectrum adjacent the frequency spectrum of the wideband luminance spectrum; and
means including recording means for recording said wideband and further luminance signals.

7. The video signal processing system set forth in claim 6 wherein said means including recording means comprises:
combining means for separably combining said wideband and further luminance signal into a combined signal; and
a video signal recorder for recording said combined signal.

8. The video signal processing system set forth in claim 7 wherein said combining means comprises:
means, responsive to said further luminance signal, for frequency shifting said further luminance signal to a spectral band substantially exclusive of the band of frequencies occupied by said wideband luminance signal; and
signal summing means for linearly combining said wideband luminance signal and frequency shifted further luminance signal.

9. The video signal processing system set forth in claim 8 wherein said means for frequency shifting said further luminance signal comprises:
means for generating a carrier signal;
a balanced modulator, responsive to said carrier signal and said further signal for generating a modulated double sideband suppressed carrier signal; and
filter means coupled to said balanced modulator for passing a single sideband of said modulated double sideband suppressed carrier signal.

10. The video signal processing system set forth in claim 8 wherein said means including recording means further includes lowpass filter means for coupling said wideband luminance signal to said signal summing means.

11. A video signal processing system comprising:
a source of extended definition television signals including a wideband composite video signal formatted in frame/fields of horizontal image lines, and a difference signal representing differences between signals from one of temporally and spatially adjacent image lines;
a source of a carrier signal synchronized to the rate of occurrence of said horizontal image lines;
suppressed carrier modulator means, responsive to said difference signal, for modulating said carrier to produce a frequency shifted difference signal occuping a frequency spectrum adjacent the frequency spectrum of the composite signal;
signal summing means coupled to said modulator and said source of extended definition television signal for combining said wideband composite signal and said frequency shifted difference signal to produce a combined signal; and
means for recording said combined signal.

* * * * *